United States Patent
Guthrie et al.

(10) Patent No.: US 9,110,808 B2
(45) Date of Patent: Aug. 18, 2015

(54) FORMATION OF AN EXCLUSIVE OWNERSHIP COHERENCE STATE IN A LOWER LEVEL CACHE UPON REPLACEMENT FROM AN UPPER LEVEL CACHE OF A CACHE LINE IN A PRIVATE SHARED OWNER STATE

(75) Inventors: Guy L. Guthrie, Austin, TX (US); William J. Starke, Round Rock, TX (US); Jeffrey Stuecheli, Austin, TX (US); Derek E. Williams, Austin, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 1419 days.

(21) Appl. No.: 12/649,725

(22) Filed: Dec. 30, 2009

(65) Prior Publication Data

US 2011/0161588 A1 Jun. 30, 2011

(51) Int. Cl.
- *G06F 12/00* (2006.01)
- *G06F 12/08* (2006.01)
- *G06F 9/38* (2006.01)

(52) U.S. Cl.
CPC .......... *G06F 12/0811* (2013.01); *G06F 9/3834* (2013.01); *G06F 12/0815* (2013.01); *G06F 12/0831* (2013.01); *Y02B 60/1225* (2013.01)

(58) Field of Classification Search
CPC G06F 9/3834; G06F 12/0811; G06F 12/0815
USPC ......................................... 711/122, 141, 144
See application file for complete search history.

(56) References Cited

U.S. PATENT DOCUMENTS

| | | | |
|---|---|---|---|
| 5,835,946 A | 11/1998 | Allen et al. | |
| 6,636,906 B1 * | 10/2003 | Sharma et al. | 710/22 |
| 6,748,501 B2 | 6/2004 | Arimilli et al. | |
| 7,228,385 B2 | 6/2007 | Guthrie et al. | |
| 7,254,678 B2 | 8/2007 | Alexander et al. | |
| 7,475,191 B2 | 1/2009 | Guthrie et al. | |
| 7,523,265 B2 * | 4/2009 | Dieffenderfer et al. | 711/141 |
| 7,533,227 B2 | 5/2009 | Guthrie et al. | |
| 2006/0179252 A1 * | 8/2006 | Cantin et al. | 711/144 |

(Continued)

OTHER PUBLICATIONS

Steiner et al. —"A Characterization of a Java-Based Commercial Workload on a High-End Enterprise Server"; ACM Digital Library; pp. 379-380; Jun. 2006.

Wang et al.—"Parallelization of IBM Mambo System Simulator in Functional Modes"; ACM Digital Library; pp. 71-76; 2007-2008.

*Primary Examiner* — Hong Kim
(74) *Attorney, Agent, or Firm* — Russell Ng PLLC; Diana L. Roberts

(57) ABSTRACT

In response to a memory access request of a processor core that targets a target cache line, the lower level cache of a vertical cache hierarchy associated with the processor core supplies a copy of the target cache line to an upper level cache in the vertical cache hierarchy and retains a copy in a shared coherence state. The upper level cache holds the copy of the target cache line in a private shared ownership coherence state indicating that each cached copy of the target memory block is cached within the vertical cache hierarchy associated with the processor core. In response to the upper level cache signaling replacement of the copy of the target cache line in the private shared ownership coherence state, the lower level cache updates its copy of the target cache line to the exclusive ownership coherence state without coherency messaging with other vertical cache hierarchies.

18 Claims, 11 Drawing Sheets

(56) References Cited

U.S. PATENT DOCUMENTS

| | | | |
|---|---|---|---|
| 2006/0212659 A1* | 9/2006 | Dieffenderfer et al. | 711/141 |
| 2007/0288694 A1* | 12/2007 | Ghai et al. | 711/118 |
| 2008/0071994 A1* | 3/2008 | Fields et al. | 711/141 |
| 2009/0006767 A1* | 1/2009 | Saha et al. | 711/145 |
| 2009/0164733 A1* | 6/2009 | Kim et al. | 711/133 |
| 2009/0198955 A1* | 8/2009 | Arimilli et al. | 711/213 |
| 2009/0210628 A1* | 8/2009 | Gaither | 711/134 |
| 2010/0169894 A1* | 7/2010 | Sheaffer et al. | 718/106 |

\* cited by examiner

FORMATION OF AN EXCLUSIVE OWNERSHIP COHERENCE STATE IN A LOWER LEVEL CACHE UPON REPLACEMENT FROM AN UPPER LEVEL CACHE OF A CACHE LINE IN A PRIVATE SHARED OWNER STATE

This invention was made with United States Government support under Agreement No. HR0011-07-9-0002 awarded by DARPA. The Government has certain rights in the invention.

BACKGROUND OF THE INVENTION

1. Technical Field

The present invention relates in general to data processing and more particularly to data caching in data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of cache states stored in association with the cache lines stored at each level of the cache hierarchy, as well as a set of coherency messages utilized to communicate the cache state information between cache hierarchies. In a typical implementation, the cache state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request. The MESI protocol allows a cache line of data to be tagged with one of four states: "M" (Modified), "E" (Exclusive), "S" (Shared), or "I" (Invalid). The Modified state indicates that a memory block is valid only in the cache holding the Modified memory block and that the memory block is not consistent with system memory. When a coherency granule is indicated as Exclusive, then, of all caches at that level of the memory hierarchy, only that cache holds the memory block. The data of the Exclusive memory block is consistent with that of the corresponding location in system memory, however. If a memory block is marked as Shared in a cache directory, the memory block is resident in the associated cache and in at least one other cache at the same level of the memory hierarchy, and all of the copies of the coherency granule are consistent with system memory. Finally, the Invalid state indicates that the data and address tag associated with a coherency granule are both invalid.

The state to which each memory block (e.g., cache line or sector) is set is dependent upon both a previous state of the data within the cache line and the type of memory access request received from a requesting device (e.g., the processor). Accordingly, maintaining memory coherency in the system requires that the processors communicate messages via the system interconnect indicating their intention to read or write memory locations. For example, when a processor desires to write data to a memory location, the processor may first inform all other processing elements of its intention to write data to the memory location and receive permission from all other processing elements to carry out the write operation. The permission messages received by the requesting processor indicate that all other cached copies of the contents of the memory location have been invalidated, thereby guaranteeing that the other processors will not access their stale local data.

In some systems, the cache hierarchy includes multiple levels, with each lower level generally having a successively longer access latency. Thus, a level one (L1) cache generally has a lower access latency than a level two (L2) cache, which in turn has a lower access latency than a level three (L3) cache.

The level one (L1) or upper-level cache is usually a private cache associated with a particular processor core in an MP system. Because of the low access latencies of L1 caches, a processor core first attempts to service memory access requests in its L1 cache. If the requested data is not present in the L1 cache or is not associated with a coherency state permitting the memory access request to be serviced without further communication, the processor core then transmits the memory access request to one or more lower-level caches (e.g., level two (L2) or level three (L3) caches) for the requested data.

Typically, when a congruence class of an upper-level cache becomes full, cache lines are removed ("evicted") and may be written to a lower-level cache or to system memory for storage. In some cases, a lower level cache (e.g., an L3 cache) is configured as a "victim" cache, which conventionally means that the lower level cache is entirely populated with cache lines evicted from one or more higher level caches in the cache hierarchy rather than by memory blocks retrieved by an associated processor. Conventional victim caches generally are exclusive, meaning that a given memory block does not reside in a higher level cache and its associated victim cache simultaneously.

SUMMARY OF THE INVENTION

In accordance with at least one embodiment, in response to a memory access request of a processor core that targets a target cache line, the lower level cache of a vertical cache hierarchy associated with the processor core supplies a copy of the target cache line to an upper level cache in the vertical cache hierarchy and retains a copy in a shared coherence state. The upper level cache holds the copy of the target cache line in a private shared ownership coherence state indicating that each cached copy of the target memory block is cached within the vertical cache hierarchy associated with the processor core. In response to the upper level cache signaling replacement of the copy of the target cache line in the private shared ownership coherence state, the lower level cache updates its copy of the target cache line to the exclusive ownership coherence state without coherency messaging with other vertical cache hierarchies.

DETAILED DESCRIPTION OF ILLUSTRATIVE EMBODIMENT

Figure 1:
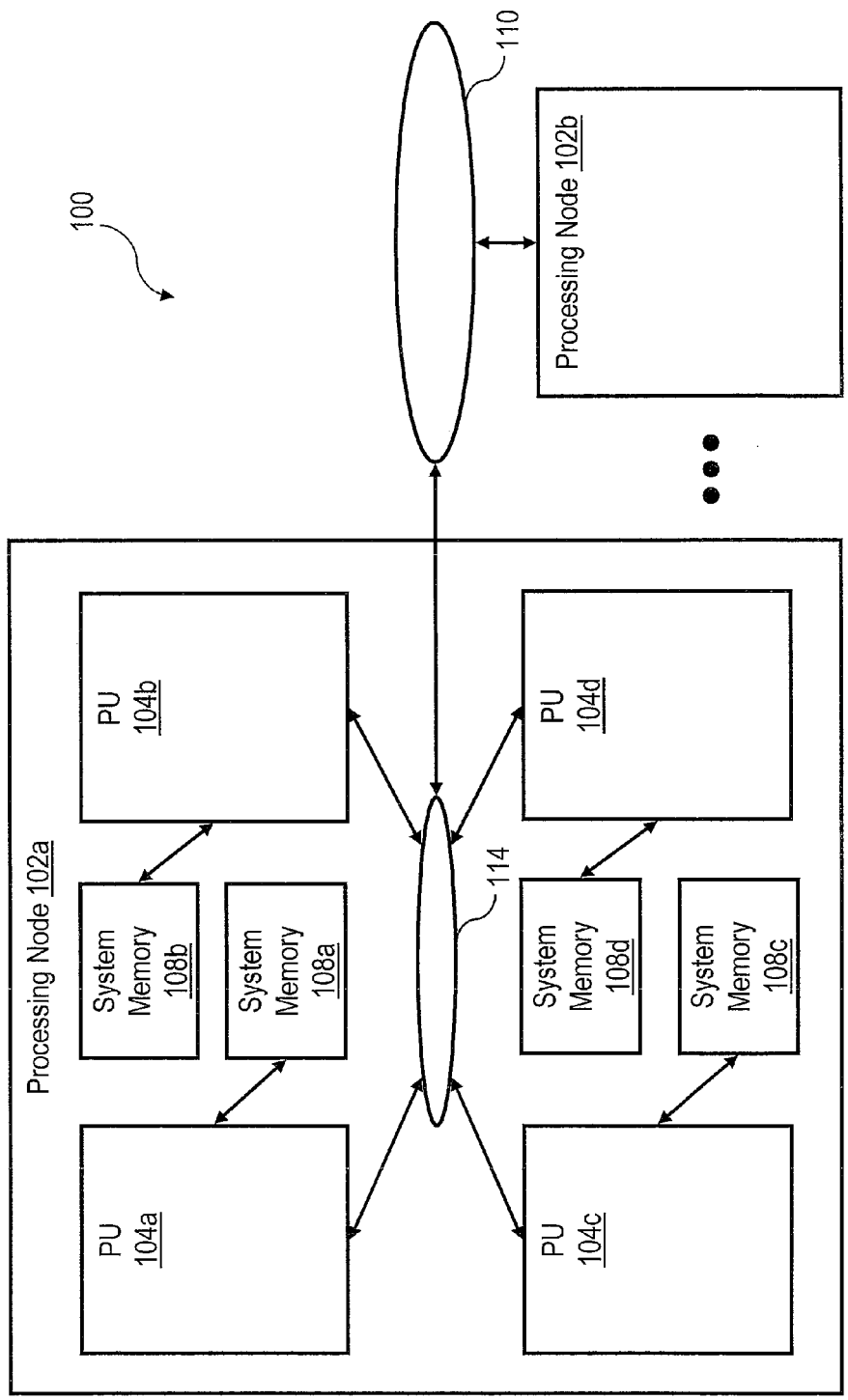
FIG. 1 is high level block diagram of an exemplary data processing system in accordance with the present invention.

With reference now to the figures and, in particular, with reference to FIG. 1, there is illustrated a high level block diagram of an exemplary embodiment of a multiprocessor data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches. Local interconnects 114 and system interconnect 110 together form an interconnect fabric, which as discussed below preferably supports concurrent communication of operations of differing broadcast scopes.

The devices coupled to each local interconnect 114 include not only processing units 104, but also one or more system memories 108a-108d. Data and instructions residing in system memories 108 can generally be accessed and modified by a processor core (FIG. 2A) in any processing unit 104 in any processing node 102 of data processing system 100. In alternative embodiments of the invention, one or more system memories 108 can be coupled to system interconnect 110 rather than a local interconnect 114.

Those skilled in the art will appreciate that data processing system 100 can include many additional unillustrated components, such as peripheral devices, interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of diverse architectures and are in no way limited to the generalized data processing system architecture illustrated in FIG. 1.

Figure 2A:
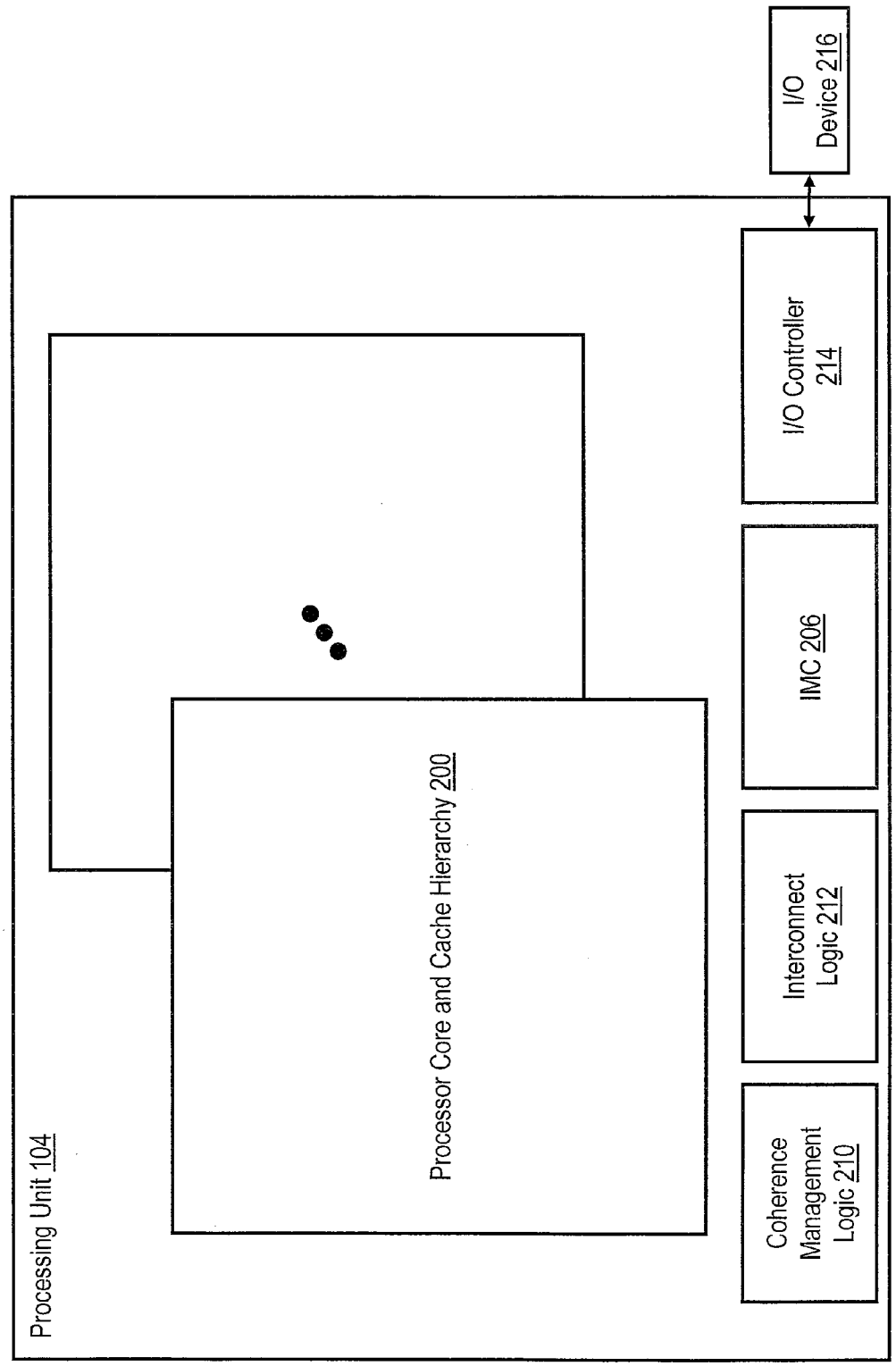
FIG. 2A is a high level block diagram of a processing unit from FIG. 1.

Referring now to FIG. 2A, there is depicted a more detailed block diagram of an exemplary processing unit 104 in accordance with the present invention. In the depicted embodiment, each processing unit 104 includes multiple instances of a processor core and associated cache hierarchy, which are collectively identified by reference numeral 200. In the depicted embodiment, each processing unit 104 also includes an integrated memory controller (IMC) 206 that controls read and write access to one or more of the system memories 108a-108d within its processing node 102 in response to requests received from processor cores and operations snooped on the local interconnect 114.

Still referring to FIG. 2A, each processing unit 104 also includes an instance of coherence management logic 210, which implements a portion of the distributed snoop-based coherency signaling mechanism that maintains cache coherency within data processing system 100. In addition, each processing unit 104 includes an instance of forwarding logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 2B:
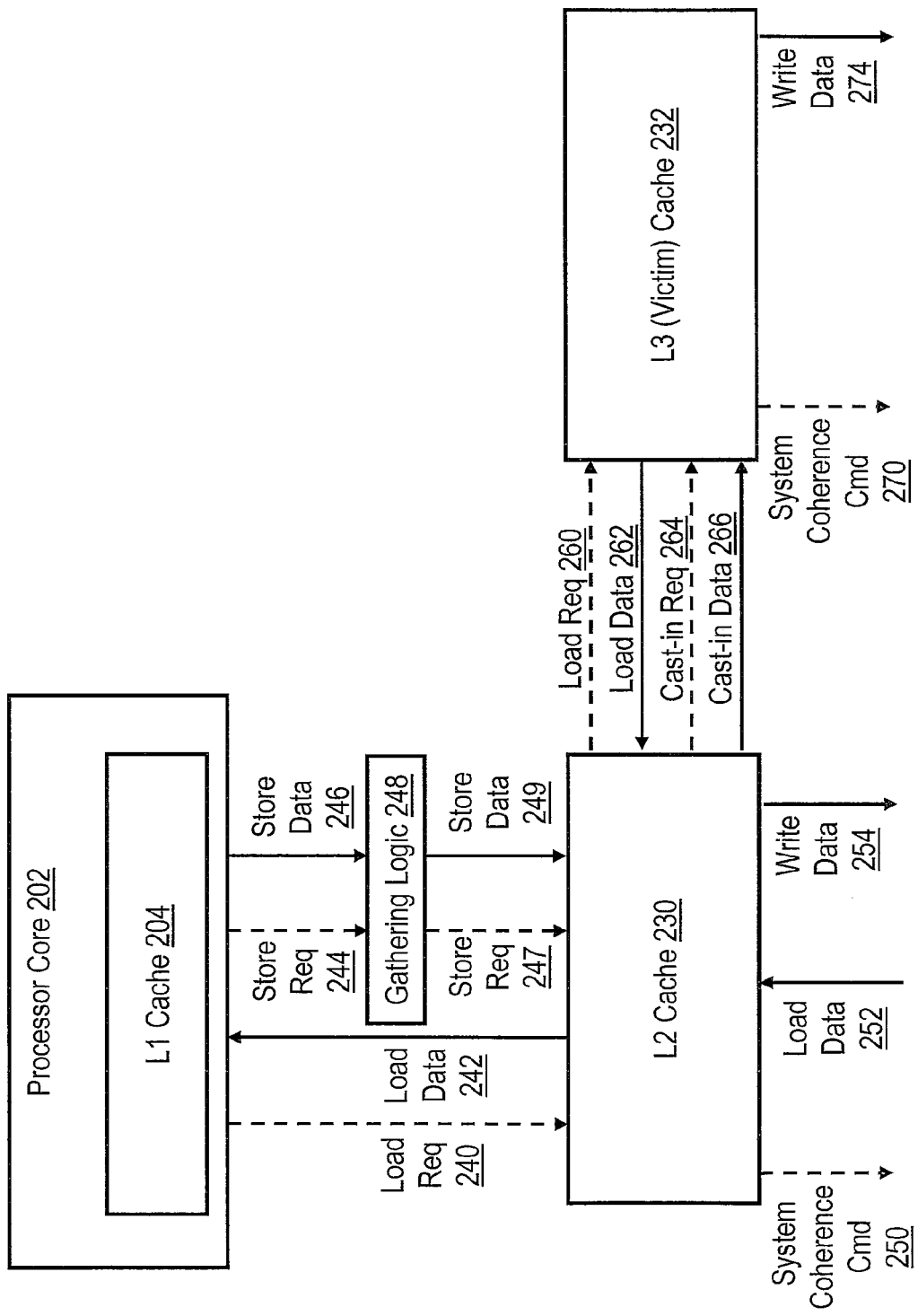
FIG. 2B is a more detailed block diagram of an exemplary embodiment of a processor core and associated cache hierarchy from FIG. 2A.

With reference now to FIG. 2B is a more detailed block diagram of an exemplary embodiment of a processor core and associated cache hierarchy 200 from FIG. 2A. Processor core 202 includes circuitry for processing instructions and data. The operation of processor core 202 is supported by a cache memory hierarchy including a store-through level one (L1) cache 204 within each processor core 202, a store-in level two (L2) cache 230, and a lookaside L3 cache 232 that is utilized as a victim cache for L2 cache 230 and accordingly is filled by cache lines evicted from L2 cache 230. In contrast to many conventional victim cache arrangements, the contents of L3 cache 232 are not exclusive of the contents of L2 cache 230, meaning that a given memory block may be held concurrently in L2 cache 230 and L3 cache 232.

FIG. 2B also illustrates an exemplary flow of requests, data and coherence communication within the cache memory hierarchy of processor core 202. In the depicted arrangement, dashed lines represent the flow of requests and coherence commands, and solid lines represent data flow.

As shown, processor core 202 transmits load requests 240 to, and receives load data 242 from L2 cache 230. Processor core 202 also transmits store requests 244 and associated store data 246 to gathering logic 248, which gathers the store data associated with multiple requests into one cache line of data and transmits the gathered store data 249 to L2 cache 230 in conjunction with one gathered store request 247. Although illustrated separately for clarity, gathering logic 248 may be incorporated within processor core 202 and/or L2 cache 230.

L2 cache 230 transmits system coherence commands 250 to coherence management logic 210 of FIG. 2A for compilation and/or transmission on the interconnect fabric. L2 cache 230 also transmits write data 254 to, and receives load data 252 from IMC 206 and/or interconnect logic 212. L2 cache 230 may also request load data from L3 cache 232 via a load request 260 and receive load data 262 from L3 cache 232. To remove a cache line from L2 cache 230, L2 cache 230 may issue a cast-in request to L3 cache 232, which in turn receives the cache line as cast-in data 266. Similar to L2 cache 230, L3 cache 232 may interact with IMCs 206 and/or cache memories in other cache hierarchies by issuing system coherence commands 270 and transmitting write data 274.

Although the illustrated cache hierarchy includes only three levels of cache, those skilled in the art will appreciate that alternative embodiments may include additional levels (L4, L5, etc.) of on-chip or off-chip in-line or lookaside cache, which may be fully inclusive, partially inclusive, or non-inclusive of the contents the upper levels of cache. Further, any of the various levels of the cache hierarchy may be private to a particular processor core 202 or shared by multiple processor cores 202. For example, in some implementations, the cache hierarchy includes an L2 cache 230 for each processor core 202, with multiple of the L2 caches 230 sharing a common L3 victim cache 232.

Figure 2C:
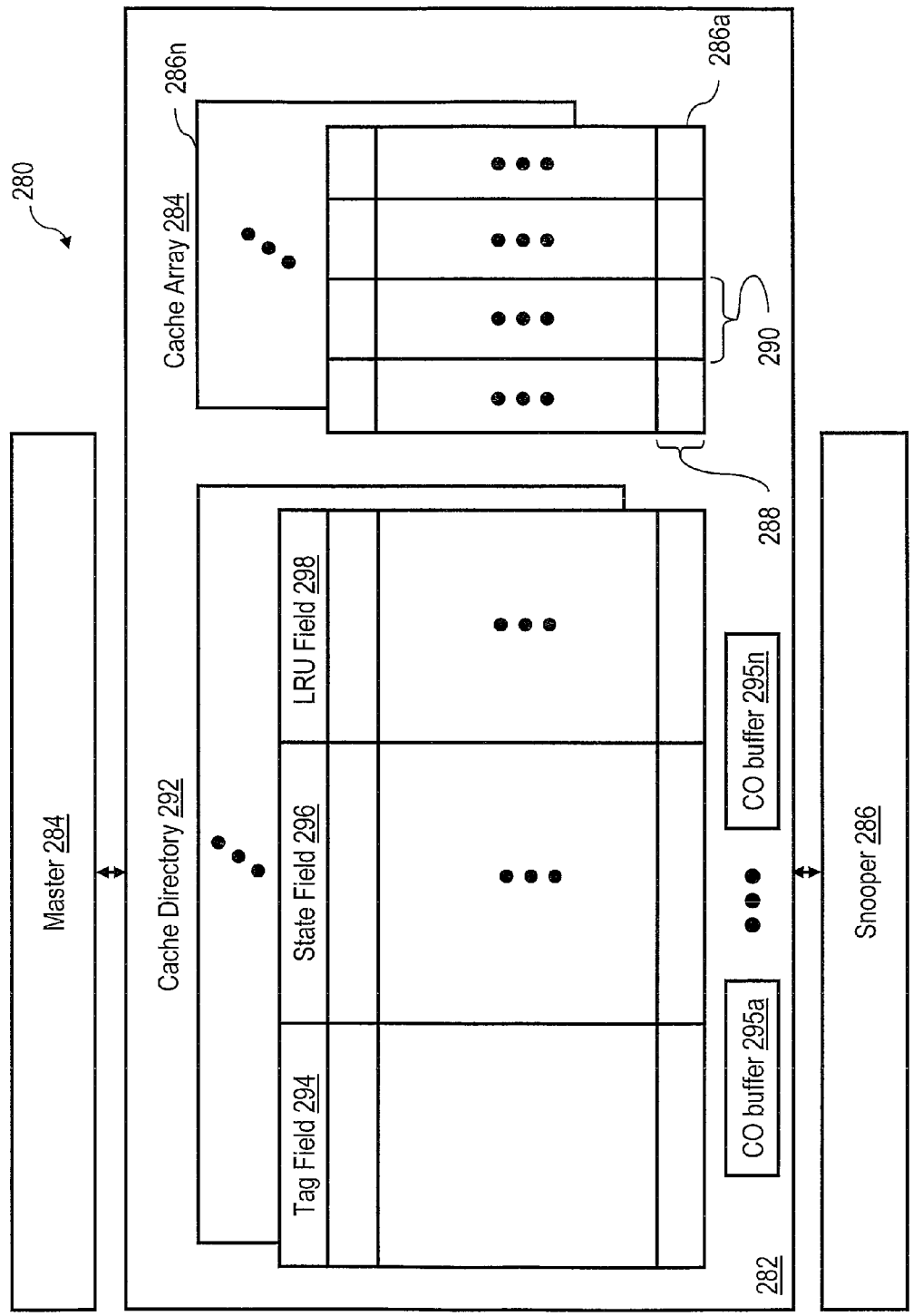
FIG. 2C is an exemplary embodiment of a cache memory from FIG. 2B.

Referring now to FIG. 2C, there is depicted, an exemplary embodiment of a cache memory 280 that may be utilized to implement L2 cache 230 or L3 cache 232 from FIG. 2B. As shown, cache memory 280 includes an array and directory 282, as well as a cache controller comprising a master 284 and a snooper 286. Snooper 286 snoops operations from local interconnect 114, provides appropriate responses, and performs any accesses to array and directory 282 required by the operations. Master 284 initiates transactions on local interconnect 114 and system interconnect 110 and accesses array and directory 282 in response to memory access (and other) requests originating within the processor core and cache hierarchy 200. In at least some embodiments, master 284 also handles casting out data to lower levels of the memory hierarchy (e.g., L3 victim cache 232 or system memory 108).

Array and directory 282 includes a set associative cache array 284 including multiple ways 286a-286n. Each way 286 includes multiple entries 288, which in the depicted embodiment each provide temporary storage for up to a full memory block of data, e.g., 128 bytes. Each cache line or memory block of data is logically formed of multiple sub-blocks 290 (in this example, four sub-blocks of 32 bytes each) that may correspond in size, for example, to the smallest allowable access to system memories 108a-108d. In at least some embodiments, sub-blocks 290 may be individually accessed and cached in cache array 284.

Array and directory 282 also includes a cache directory 292 of the contents of cache array 284. As in conventional set associative caches, memory locations in system memories 108 are mapped to particular congruence classes within cache arrays 284 utilizing predetermined index bits within the system memory (real) addresses. The particular cache lines stored within cache array 284 are recorded in cache directory 292, which contains one directory entry for each cache line in cache array 284. As understood by those skilled in the art, each directory entry in cache directory 292 comprises at least a tag field 294, which specifies the particular cache line stored in cache array 284 utilizing a tag portion of the corresponding real address, a LRU (Least Recently Used) field 298 indicating a replacement order for the cache line with respect to other cache lines in the same congruence class, and a state field 296, which indicates the coherence state (also referred to as cache state) of the cache line.

Although the exemplary embodiment illustrates that each state field 296 provides state information for a respective associated cache line in cache array 284, those skilled in the art will appreciate that in alternative embodiments a cache directory 292 can include a respective state field for each sub-block 290. Regardless of which implementation is selected, the quantum of data associated with a coherence state is referred to herein as a coherence granule.

To support the transfer of castout cache lines, array and directory 282 includes at least one and preferably multiple castout (CO) buffers 295a-295n, which are each preferably identified with a unique respective CO buffer ID. While a CO buffer 295 is allocated to master 284 for a castout operation, the CO buffer 295 has a "busy" state, and when the CO buffer is released or deallocated by master 284, then the CO 295 buffer has a "done" state.

In a preferred embodiment, data processing system 100 maintains coherency with a non-blocking, broadcast-based coherence protocol that utilizes a set of predefined coherence states in state fields 296 and a robust set of associated request, response, and notification types. Coherence requests are broadcast with a selected scope to cache memories, as well as IMCs 206 and I/O controllers 214. As discussed further below, the selected scope of broadcast can be "global", that is, inclusive of all participants (e.g., IMCs 206, IOCs 214, L2 caches 230 and L3 caches 232) in data processing system 100 or have a more restricted scope excluding at least some participants. In response to snooping the coherence requests, the participants provide partial responses (PRESPs), which are aggregated (preferably at coherence management logic 210 of the requesting processing unit 104) to form the basis for a coherence transfer decision. Notification of the decision is subsequently broadcast to the participants in a combined response (CRESP) indicating the final action to be taken. Thus, the coherence protocol employs distributed management.

In a preferred embodiment, global and local (or scope-limited) broadcast transport mechanisms are both integrated. Thus, a given request can be broadcast globally or locally, where a local scope may correspond, for example, to a single processing node 102. If all information necessary to resolve a coherence request exists within the local broadcast scope, then no global broadcast is necessary. If a determination cannot be made that all information necessary to resolve the coherence request is present within the local broadcast scope, the coherence request is broadcast globally (or at least with an increased scope including at least one additional participant).

To ensure a reasonable likelihood of a successful local resolution of coherence requests, a mechanism indicative of the distribution of cached copies of memory blocks within the cache hierarchies is useful. In a preferred embodiment, the mechanism includes inclusion of a scope-state indication per memory block (e.g., 128 bytes) in system memory 108 and an appropriate set of coherence states for state fields 296 in L2 and L3 caches 230, 232. In one embodiment, the scope-state indication for each memory block is a single bit integrated into the redundant content for error correction stored in system memory 108. For each memory block, the scope-state indicator indicates whether the memory block might be in use outside of the local scope where the system memory 108 resides. Since the scope-state indicator is stored with the data bits, the scope-state bit is automatically read or written whenever the data is read or written.

Coherence states that may be utilized in state field 296 to indicate state information may include those set forth in Table I below. Table I lists the name of various coherence states in association with a description of the state, an indication of the authority conveyed by the coherence state to read and/or update (which includes the authority to read) the associated cache line, an indication of whether the coherence state permits other cache hierarchies to concurrently hold the associated cache line, an indication of whether the associated cache line is castout upon deallocation, and an indication of if and when the associated cache line is to be sourced in response to snooping a request for the cache line. A further description of the implementation of at least some of these coherence states is described in detail in U.S. patent application Ser. No. 11/055,305, now U.S. Pat. No. 7,389,388, issued Jun. 17, 2008, which is incorporated herein by reference.

cache hierarchy, and in this sense, are "private" to that vertical cache hierarchy. As indicated, an L2 cache 230 holding a cache line in any of the Txp private shared ownership coherence states can supply the cache line in response to the request without waiting for the combined response (CRESP), provided that the L2 cache 230 invalidates the shared copy in the L3 cache 232 of the same vertical cache hierarchy. Advantageously, such invalidation can be performed within the vertical cache hierarchy containing the Txp cache line via private L2-to-L3 communication without any coherency messaging on the interconnect fabric with any other vertical cache hierarchy in data processing system 100.

As shown in Table II below, a number of the coherence states set forth in Table I provide low-latency access to high-usage scope states while protecting system memories 108 from increased traffic due to scope-state queries and updates.

TABLE I

| State | Description | Authority | Sharers | Data Castout | Source data |
|---|---|---|---|---|---|
| I | Invalid | None | N/A | N/A | N/A |
| Id | Deleted, do not allocate | None | N/A | N/A | N/A |
| Ig | Invalid, cached scope-state | None | N/A | N/A | N/A |
| In | Invalid, scope predictor | None | N/A | N/A | N/A |
| S | Shared | Read | Yes | No | No |
| Sl | Shared, local data source | Read | Yes | No | At request |
| T | Formerly Mu, now shared | Update | Yes | Yes | At CRESP |
| Te | Formerly Me, now shared | Update | Yes | No | At CRESP |
| Tn | Formerly Mu, now shared | Update | Yes | Yes | At CRESP |
| Ten | Formerly Me, now shared | Update | Yes | No | At CRESP |
| Tp | Formerly M, now shared | Update | Yes, within same vertical cache hierarchy only | Yes | At request |
| Tep | Formerly Me, now shared | Update | Yes, within same vertical cache hierarchy only | No | At request |
| Tup | Formerly Mu, now shared | Update | Yes, within same vertical cache hierarchy only | Yes | At request |
| M | Modified, avoid sharing | Update | No | Yes | At request |
| Me | Exclusive | Update | No | No | At request |
| Mu | Modified, bias toward sharing | Update | No | Yes | At request |

Herein, the M, Me and Mu coherence states are referred to as "exclusive ownership" coherence states, meaning that only a single cached copy of a given cache line in one of these states exists anywhere in data processing system 100 and that the cache holding that copy has authority to update the cache line. Such exclusive ownership coherence states stand in contrast to the Tx coherence states (where the "x" refers to any of the T, Te, Tn, Ten, Tp, Tep, and Tup variants of the base T coherence state), which are referred to herein as "shared ownership" coherence states. Such shared ownership coherence states, like the exclusive ownership coherence states, denote the authority to update the associated cache line, but, in contrast to the exclusive ownership coherence states, indicate that one or more additional shared copies of the associated cache line may be cached in data processing system 100.

The Tp, Tep and Tup coherence states are further referred to herein as "private shared ownership" coherence states to indicate that all cached copies of a cache line in a private shared ownership coherence state reside in the same vertical Note that when a cached scope state is deallocated, it is typically cast out (i.e., written back) to memory. For cases in which the implied scope state might be global, the castout is functionally required to ensure that coherence is maintained. For cases in which the implied scope state is known to be local, the castout is optional, as it is desirable but not necessary to localize the broadcast scope for subsequent operations.

TABLE II

| State | Implied scope state | Scope-state castout |
|---|---|---|
| I | None | None |
| Id | None | None |
| Ig | Existing copies probably global | Required, global |
| In | Existing copies probably local | None |
| S | Unknown | None |
| Sl | Unknown | None |

TABLE II-continued

| State | Implied scope state | Scope-state castout |
|---|---|---|
| T | Shared copies probably global | Required, global |
| Te | Shared copies probably global | Required, global |
| Tn | Shared copies all in local node | Optional, local |
| Ten | Shared copies all in local node | None |
| Tp | Shared copies all in same vertical cache hierarchy | Optional, local |
| Tep | Shared copies all in same vertical cache hierarchy | None |
| Tup | Shared copies all in same vertical cache hierarchy | Optional, local |
| M | Local | Optional, local |
| Me | Local | None |
| Mu | Local | Optional, local |

The combination of the scope-state bits in system memory 108 and the coherence states described herein provides a low-cost alternative to a directory-based approach and integrates cleanly into the non-blocking, broadcast-based distributed coherence protocol. Because some workloads localize well and others do not, processing unit 104 may also incorporate a number of predictors to determine whether a given coherence request should be initially broadcast with a local scope or should be broadcast globally immediately. For workloads that exhibit a high degree of processor-to-memory localization, and for workloads that have varying mixtures of locally resolvable traffic, laboratory results show that scope-limited speculative snoop resolution is highly effective.

Figure 3:
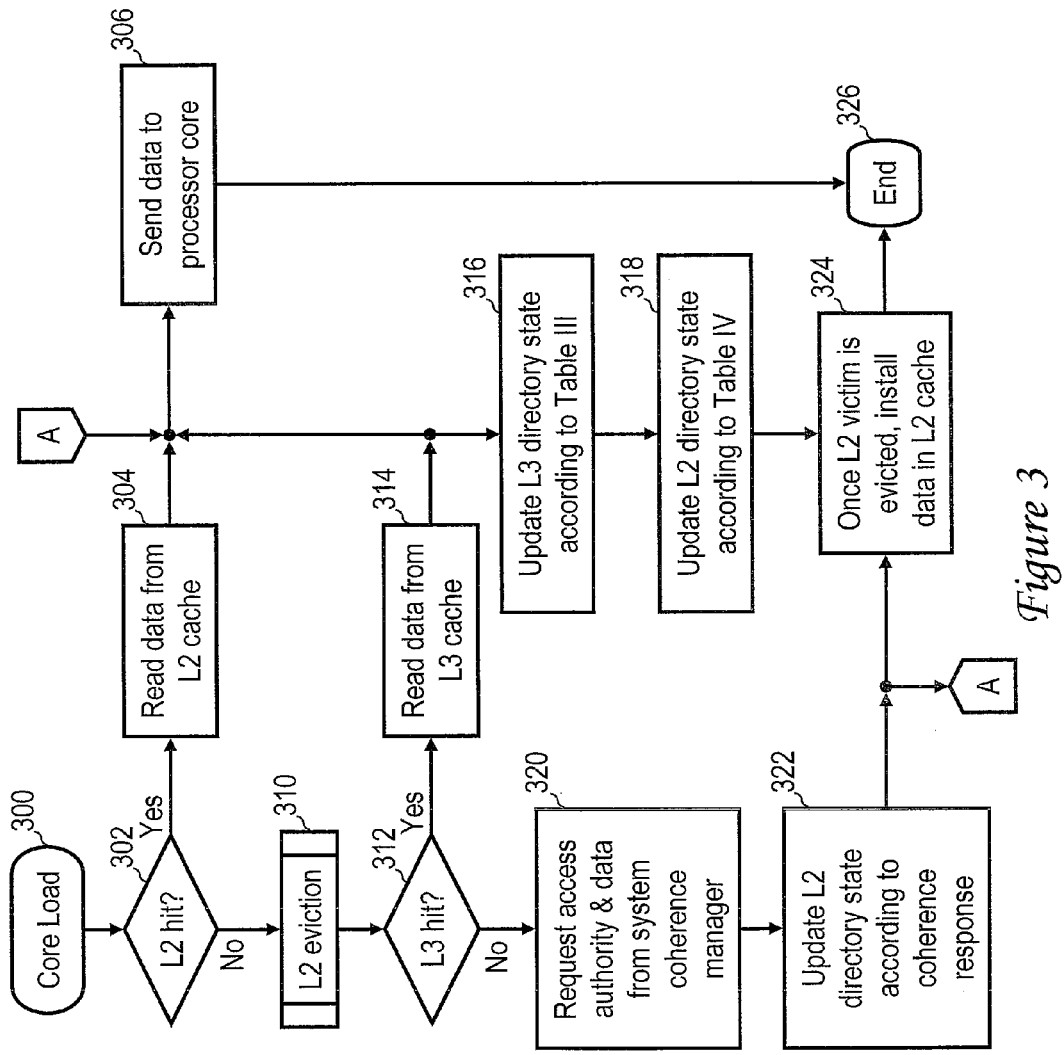
FIG. 3 is a high level logical flowchart of an exemplary method of performing a processor load in accordance with one embodiment.

With reference now to FIG. 3, there is illustrated a high level logical flowchart of an exemplary method of performing a load of a processor core in accordance with one embodiment. The illustrated process begins at block 300 in response to receipt by L2 cache 230 of a load request 240 from its associated processor core 202. In response to the load request 240, master 284 of L2 cache 230 accesses its cache directory 292 to determine whether or not the target address specified by load request 240 hits in cache directory 292 (block 302). If so, the process then proceeds to blocks 304 and 306, which depict master 284 of L2 cache 230 reading the requested cache line of data from its cache array 284 and then sending the cache line of data to the requesting processor core 202. Thereafter, the process terminates at block 326.

Returning to block 302, in response to an L2 miss, the process proceeds to block 310, which illustrates L2 cache 230 selecting and initiating eviction of a victim cache line, as discussed further below with reference to FIGS. 5-6. In addition, L2 cache 230 transmits the load request to L3 cache 232 as a load request 260. Consequently, master 284 of L3 cache 232 accesses its cache directory 292 to determine whether or not the target address specified by load request 260 hits in cache directory 292 of L3 cache 232 (block 312). If not, the process passes to block 320, which is described below. If, however, load request 260 hits in cache directory 292 of L3 cache 232, the process proceeds to block 314, which depict master 284 of L3 cache 232 reading the requested cache line of data from cache array 284 of L3 cache 232. The process then bifurcates and proceeds to blocks 306 and 316.

As noted above, block 306 depicts L3 cache 232 sending the requested cache line of data to the requesting processor core 202. Thereafter, the first branch of the process ends at block 326. Block 316 illustrates master 284 of L3 cache 232 updating the coherence state of the requested cache line of data in cache directory 292 of L3 cache 232 in accordance with Table III, below.

TABLE III

| Initial L3 State | Final L3 State |
|---|---|
| I | n/a |
| Id | n/a |
| Ig | n/a |
| In | n/a |
| S | S, LRU |
| Sl | S, LRU |
| T | S, LRU |
| Te | S, LRU |
| Tn | S, LRU |
| Ten | S, LRU |
| M | S, LRU |
| Me | S, LRU |
| Mu | S, LRU |

Thus, in contrast with conventional implementations in which any fetch that hit in an L3 victim cache in a data-valid coherency state (e.g., M, Mu, Me, T, Te, Tn, Ten, Sl or S) resulted in the invalidation of the matching cache line in the L3 directory, Table III discloses that a fetch hit in the Mx, Tx or Sx states (where the "x" refers to any variant of the base M, T and S coherence state) preserves the matching cache line in L3 cache 232 in the S state and in a replacement order other than Most Recently Used (e.g., LRU or LRU-1). In this way, the likelihood of a castout hit in L3 cache 232 is increased, which as discussed further below, reduces data movement and thus power dissipation in the event of an L2 eviction.

As illustrated at block 318, master 284 of L2 cache 230 also updates the state of the requested cache line of data in cache directory 292 of L2 cache 230 in accordance with Table IV, below.

TABLE IV

| Initial L3 State | Final L2 State |
|---|---|
| I | n/a |
| Id | n/a |
| Ig | n/a |
| In | n/a |
| S | S |
| Sl | Sl |
| T | T |
| Te | Te |
| Tn | Tn |
| Ten | Ten |
| M | Tp |
| Me | Tep |
| Mu | Tup |

It should be noted with reference to Table IV that on a read of a cache line of data in an Mx coherence state from the L3 cache 232, the state of the requested cache line of data is updated in the requesting L2 cache 230 to a corresponding Txp coherence state (i.e., Tp, Tep or Tup), reflecting the retention of a copy of the requested cache line in the L3 cache 232 in the same vertical cache hierarchy in the S state. In this manner, if the requested cache line is subsequently replaced from the L2 cache 230 while in a Txp coherence state, the corresponding Mx coherence state can be advantageously reformed in the L3 cache 232 in the same vertical cache hierarchy without any coherency messaging with other cache hierarchies. Reforming the Mx coherence state in L3 cache 232 can also be accomplished without consuming the power and bandwidth required to transport a copy of the cache line from L2 cache 230 back to L3 cache 232 if at the time of replacement L3 cache 232 retains (i.e., has not replaced) its copy of the cache line.

As shown at block 324, once the victim cache line has been evicted from L2 cache 230, the cache line of data supplied to processor core 202 is also installed in L2 cache 230 (block 324). Thereafter, the process terminates at block 326.

Referring now to block 320, in response to the load requests 240, 260 missing in L2 cache 230 and L3 cache 232, master 284 of L2 cache 230 requests access authority and the target memory block from the system coherence manager (e.g., the distributed coherence management system described above) by transmitting an appropriate command 250 to the local instance of interconnect logic 212. Master 284 then updates the coherence state for the target memory block in its cache directory 292 in accordance with the coherence response (also referred to as combined response (CRESP)) for its request (block 322). Master 284 also supplies the target memory block to the requesting processor core, as indicated by the process passing through page connector A to block 306. In addition, once eviction of the L2 victim is complete and load data 252 is received, master 284 updates cache array 284 with the target memory block (block 324). Thereafter, the process ends at block 326.

Figure 4:
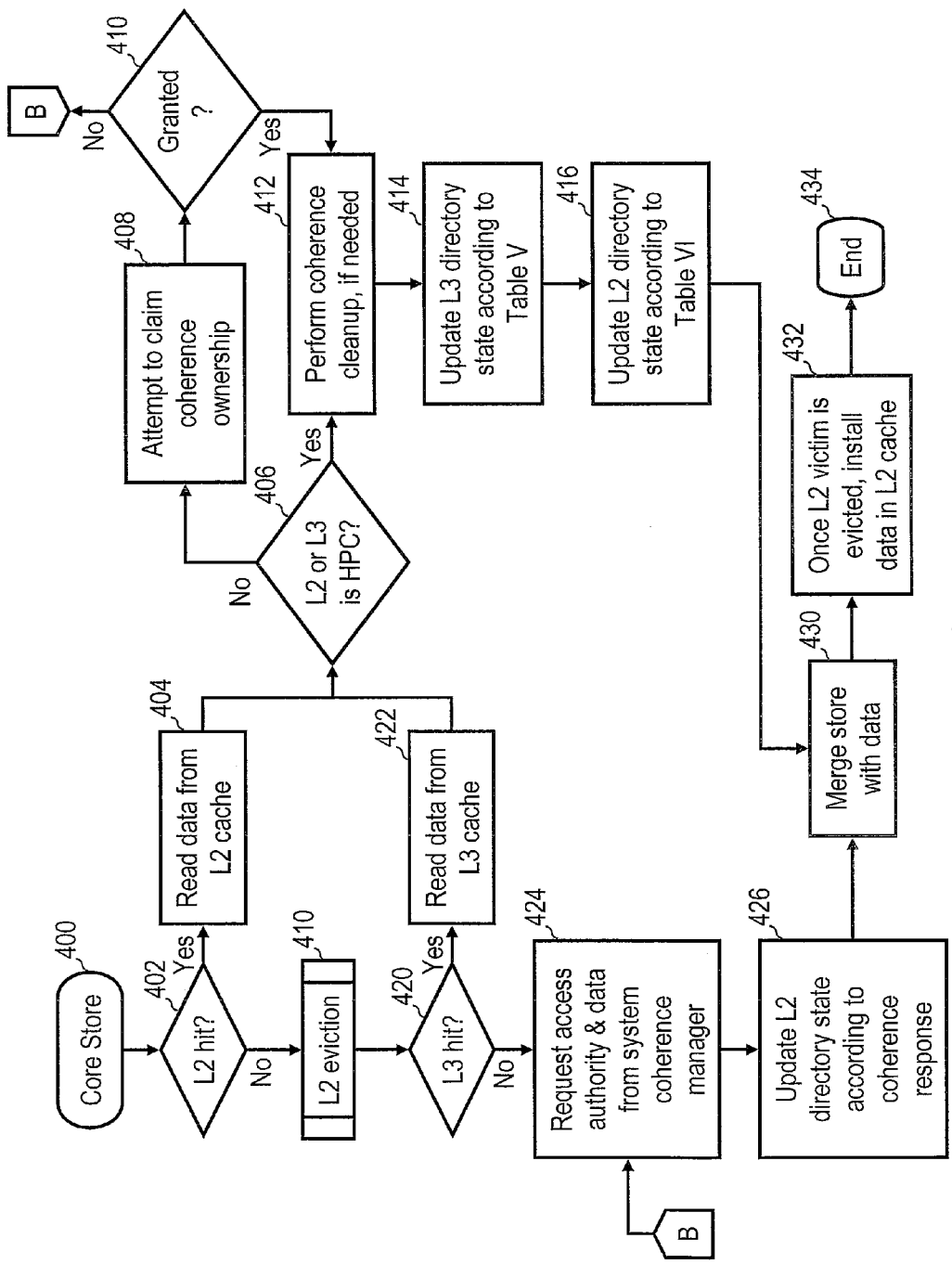
FIG. 4 is a high level logical flowchart of an exemplary method of performing a processor store in accordance with one embodiment.

Referring now to FIG. 4, there is depicted a high level logical flowchart of an exemplary method of performing a processor store in accordance with one embodiment. The illustrated process begins at block 400 in response to receipt by L2 cache 230 of a store request 247 from its associated processor core 202. In response to store request 247, master 284 of L2 cache 230 accesses its cache directory 292 to determine whether or not the target address specified by load request 240 hits in cache directory 292 (block 402). If so, the process then proceeds to block 404, which depicts master 284 of L2 cache 230 reading the requested cache line of data from cache array 284 of L2 cache 230. The process then passes to block 406, which is described below.

Returning to block 402, in response to a determination that the target address of the store request 247 missed in cache directory 292 of L2 cache 230, master 284 initiates eviction of a victim cache line from L2 cache 230, as shown at block 410 and as described further below with reference to FIGS. 5-6. Master 284 also forwards the target address of store request 247 to L3 cache 232. In response to receipt of the target address of store request 247, master 284 of L3 cache 232 accesses its cache directory 292 to determine whether or not the target address specified by load request 240 hits in cache directory 292 (block 420). If not, the process passes to block 424 and following blocks, which are described below. If, however, the target address of store request 247 hits in cache directory 292 of L3 cache 232, the process proceeds to block 422, which depicts master 284 of L3 cache 232 reading the requested cache line of data from cache array 284 of L3 cache 232. The process then passes to block 406.

Block 406 determines the master 284 of the L2 or L3 cache memory in which the target address hit determining whether or not it is the highest point of coherency (HPC) for the target memory block associated with the target address. An HPC is defined herein as a uniquely identified device that caches a true image of the memory block (which may or may not be consistent with the corresponding memory block in system memory 108) and has the authority to grant or deny a request to modify the memory block. Descriptively, the HPC may also provide a copy of the memory block to a requestor in response to an operation that does not modify the memory block. Although other indicators may be utilized to designate an HPC for a memory block, a preferred embodiment of the present invention designates the HPC, if any, for a memory block utilizing selected cache coherence state(s). Thus, assuming the coherence states set forth in Tables I and II, above, an L2 cache 230 or L3 cache 232 is designated as an HPC by holding the target memory block in any of the T, Te, Tn, Ten, M, Me or Mu states.

If the master 284 determines at block 406 that its cache 230 or 232 is the HPC for the target memory block, the process passes to block 412, which is described below. If, however, the master 284 determines that its cache is not the HPC for the target memory block, for example, because the target address hit in the S or Sl coherence state, then master 284 attempts to claim coherence ownership of the target memory block and assume the designation of HPC by transmitting a DClaim (data claim) operation on the interconnect fabric via interconnect logic 212 (block 408). Master 284 determines whether the attempt to claim coherence ownership is granted at block 410 by reference to the system coherence response (CRESP) to the DClaim. If the attempt to claim coherence ownership is not granted, which typically means that master 284 has been forced to invalidate its copy of the target memory block by a competing master 284 in another cache hierarchy, the process passes through page connector B to block 424, which is described below. If, however, the master 284 determines at block 410 that the attempt to claim coherence ownership is successful, master 284 performs any coherence "cleanup" necessary to ensure that it alone has a valid cached copy of the target cache line, as shown at block 412. The coherence "cleanup" typically entails issuing one or more kill requests on local interconnect 114 and/or system interconnect 110 via interconnect logic 212 to invalidate other cached copies of the target memory block.

Next, at block 414 master 284 of L3 cache 232 updates the coherence state of the target memory block in cache directory 292 of L3 cache 232 in accordance with Table V, below.

TABLE V

| Initial L3 State | Final L3 State |
| --- | --- |
| M | I |
| Mu | I |
| Me | I |
| T | I |
| Te | I |
| Tn | I |
| Ten | I |
| SL | I |
| S | I |
| Ig | n/a |
| In | n/a |
| I | n/a |

As illustrated at block 416, master 284 of L2 cache 230 also updates the state of the target memory block in cache directory 292 of L2 cache 230 in accordance with Table VI, below. As indicated, the target memory block will have an M or Mu coherency state, depending upon whether sharing of the target memory block should be encouraged. This determination can be made on a number of factors, including the type of store access that updated the target memory block. Further details can be found, for example, in U.S. Pat. No. 6,345,343 and U.S. patent application Ser. No. 11/423,717, filed Jun. 13, 2006, now abandoned, which are incorporated herein by reference.

TABLE VI

| Initial L2 or L3 State | Final L2 State |
| --- | --- |
| M | M or Mu |
| Mu | M or Mu |

TABLE VI-continued

| Initial L2 or L3 State | Final L2 State |
|---|---|
| Me | M or Mu |
| T | M or Mu |
| Te | M or Mu |
| Tn | M or Mu |
| Ten | M or Mu |
| Sl | M or Mu |
| S | M or Mu |
| Ig | n/a |
| In | n/a |
| I | n/a |

The process proceeds from block 416 to block 430, which is described below.

Referring now to block 424, master 284 of L2 cache 230 requests the target memory block and permission to modify the target memory block from the distributed system coherence manager by transmitting an appropriate command (e.g., Read-with-intent-to-modify (RWITM)) to the local instance of interconnect logic 212. Master 284 then updates the coherence state for the target memory block in its cache directory 292 in accordance with the coherence response for its request (block 426). Assuming the request was successful, master 284 of L2 cache 230 merges the store data 249 received from processor core 202 with the target memory block (block 430). Thus, master 284 may update one or more granules 290 of the target memory block. In addition, once eviction of the L2 victim is complete, master 284 of L2 cache 230 updates cache array 284 with the target memory block (block 432). Thereafter, the process ends at block 434.

Figure 5:
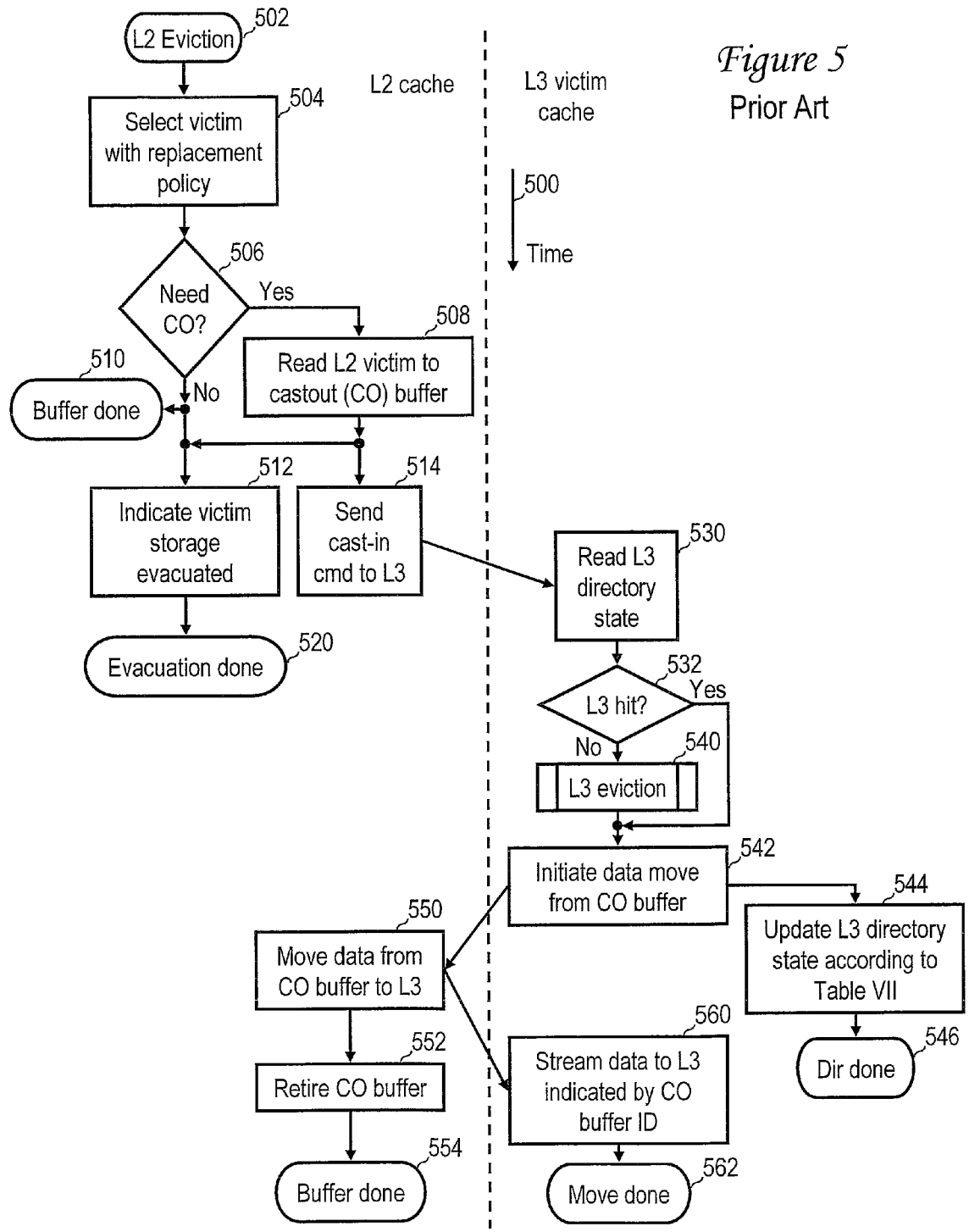
FIG. 5 is a high level flowchart of a process for performing an L2 eviction and L3 cast-in in accordance with the prior art.

With reference now to FIG. 5, there is illustrated a high level flowchart of exemplary method of evicting a victim cache line from an L2 cache and casting-in the victim cache line into an L3 victim cache in accordance with the prior art. The steps depicted on the left side of FIG. 5 are those performed by a conventional L2 cache and those shown on the right side of FIG. 5 are performed by a conventional L3 victim cache. Steps are generally shown in chronological order, with time advancing in the direction of arrow 500.

The illustrated process begins at block 502 in response a core load or core store request missing in the L2 cache. In response to the L2 cache miss, the L2 cache selects a victim line for replacement in accordance with a selected replacement policy (e.g., least recently used), as depicted at block 504. As indicated at block 506, the L2 cache then reads the L2 directory to determine whether or not a castout should be performed, for example, by determining if the selected victim line has a data-valid coherence state (e.g., Mx, Tx or Sx, where the "x" refers to any variant of the base coherence state) or a scope-state indication coherence state, such as Ig or In. If not, then the CO buffer allocated to the L2 eviction is deallocated and assumes the "done" state (block 510). Because the victim line contains no valid data that must be preserved, the L2 cache can also indicate that the storage location of the victim cache line in the L2 array has been evacuated (blocks 512, 520) and can be filled with a new cache line of data.

Returning to block 506, if the L2 cache determines that the L2 directory indicates that a castout is to be performed, then the L2 cache reads the victim cache line from the L2 cache array into a castout (CO) buffer, as depicted at block 508. The L2 cache then indicates that the storage location of the victim cache line in the L2 array has been evacuated (blocks 512, 520). In addition, the L2 cache transmits a cast-in command to the L3 victim cache (block 514). The cast-in command may contain or be accompanied by the real address of the victim cache line, the L2 coherence state, and a CO buffer ID.

Figure 7A:
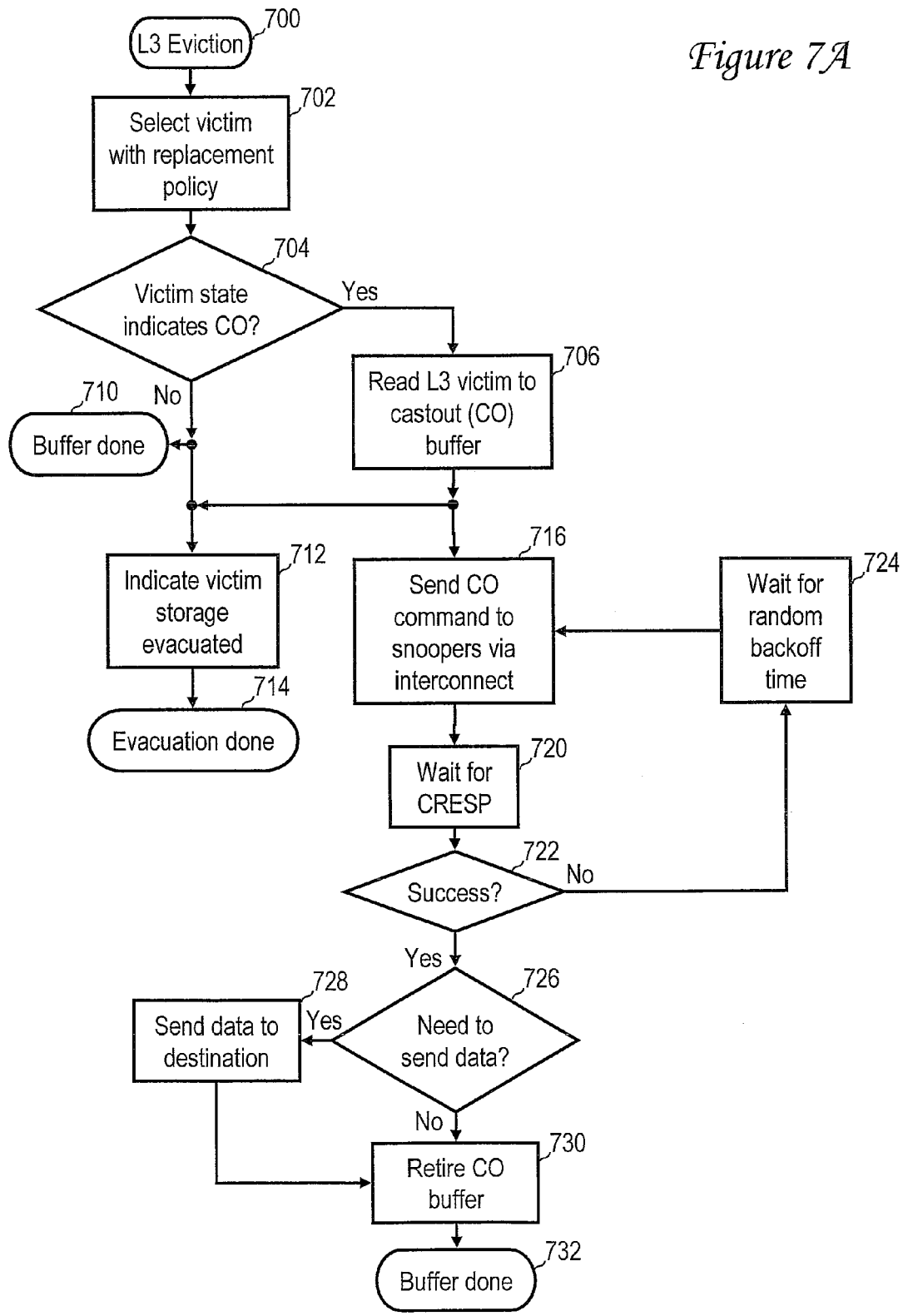
FIG. 7A is a high level logical flowchart of an L3 eviction in accordance with one embodiment.

In response to receipt of the cast-in command, the L3 victim cache reads the coherence state associated with the specified address in its directory (block 530). If the L3 directory indicates a data-valid coherence state (block 532), then the process proceeds to block 542, which is described below. If, however, the L3 victim cache determines that the address specified by the cast-in command misses in the L3 cache array, then the L3 victim cache begins the process of evicting a selected victim cache line from the L3 array (block 540), as shown in FIG. 7A. The L3 victim cache then initiates a data move of the cast-in data from the CO buffer of the L2 cache to the L3 victim cache by issuing to the L2 cache a data move command specifying the relevant CO buffer ID (block 542). In addition, the L3 victim cache updates the L3 directory in accordance with Table VII below (block 544). (The designation Err in Table VII indicates an error condition.) Following block 544, the L3 directory update is complete, as depicted at block 546.

TABLE VII

| Initial | L2 Castout State | | | | | | | | | | |
|---|---|---|---|---|---|---|---|---|---|---|---|
| L3 State | M | Mu | Me | T | Te | Tn | Ten | SL | S | Ig | In |
| M | Err | Err | Err | Err | Err | Err | Err | Err | Err | M | M |
| Mu | Err | Err | Err | Err | Err | Err | Err | Err | Err | Mu | Mu |
| Me | Err | Err | Err | Err | Err | Err | Err | Err | Err | Me | Me |
| T | Err | Err | Err | Err | Err | Err | Err | T | T | T | T |
| Te | Err | Err | Err | Err | Err | Err | Err | Te | Te | Te | Te |
| Tn | Err | Err | Err | Err | Err | Err | Err | Tn | Tn | Tn | Tn |
| Ten | Err | Err | Err | Err | Err | Err | Err | Ten | Ten | Ten | Ten |
| SL | Err | Err | Err | T | Te | Tn | Ten | Err | SL | Ig | SL |
| S | Err | Err | Err | T | Te | Tn | Ten | SL | S | Ig | S |
| Ig | M | Mu | Me | T | Te | Tn | Ten | Ig | Ig | Ig | Ig |
| In | M | Mu | Me | T | Te | Tn | Ten | SL | S | Ig | In |
| I | M | Mu | Me | T | Te | Tn | Ten | SL | S | Ig | In |

In response to receipt of the data move command of the L3 victim cache issued at block 542, the L2 cache transfers the data in the specified CO buffer to the L3 victim cache, as indicated at block 550. In a typical implementation, the victim cache line is transmitted in association with the CO buffer ID. Following the data transfer, the L2 cache retires or deallocates the CO buffer (block 552), indicating usage of the CO buffer is complete (block 554). In response to receipt of the victim cache line and CO buffer ID, the L3 victim cache places the cast-in data into the L3 array in the location indicated by the CO buffer ID (block 560), thereby completing the movement of the victim cache line from the L2 cache to the cache array of the L3 victim cache (block 562).

It should be appreciated that the conventional process depicted in FIG. 5 consumes power when the L2 cache array is read at block 508, regardless of whether or not a cast-in to the L3 victim cache is performed. Power in also dissipated in transferring cast-in data from the L2 cache to the L3 victim cache, even in the case of an L3 cache hit in which no data transfer is necessary. To reduce power dissipation, at least one embodiment reduces data movement and/or array accesses in a cache hierarchy including an upper level cache and a lower level victim cache. An exemplary process for performing an L2-to-L3 cast-in having reduced power consumption is now described with reference to FIG. 6.

Figure 6:
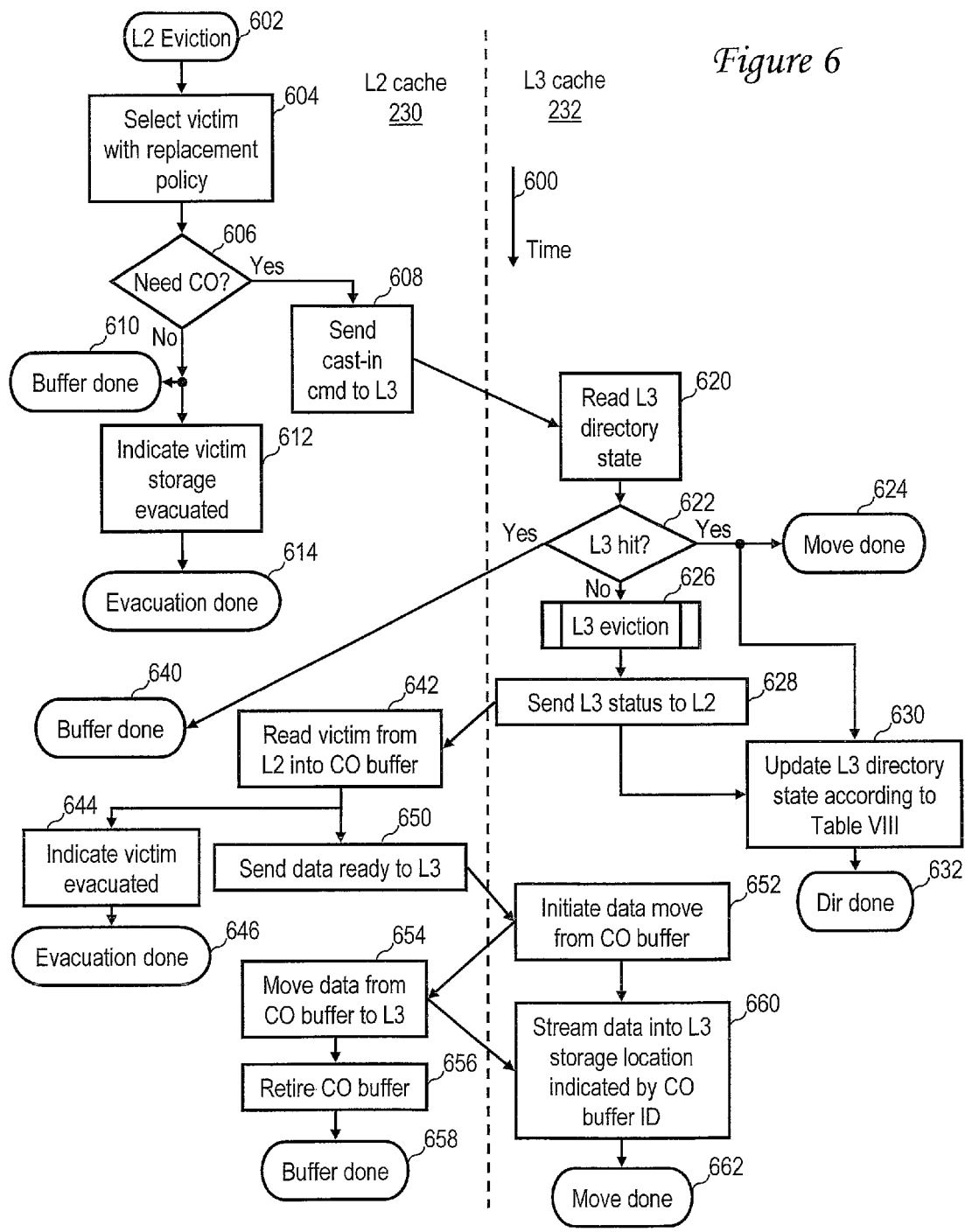
FIG. 6 is a high level flowchart of an exemplary process for performing an L2 eviction and L3 cast-in in accordance with one embodiment.

Referring now to FIG. 6, there is depicted a high level flowchart of a process of performing an L2 eviction and casting-in the victim cache line into an L3 victim cache in accordance with the one embodiment. As with FIG. 5, the steps depicted on the left side of FIG. 6 are those performed by an L2 cache, such as L2 cache 230, and those shown on the right side of FIG. 6 are performed by an L3 victim cache, such as L3 cache 232. Steps are generally shown in chronological order, with time advancing in the direction of arrow 600.

The illustrated process begins at block 602 in response to an L2 cache miss as shown, for example, at block 310 of FIG. 3 or block 410 of FIG. 4. In response to the L2 cache miss, L2 cache 230 allocates a CO buffer 295 to perform an L2 eviction and selects a victim cache line for replacement in accordance with a selected replacement policy (e.g., least recently used or a variant thereof), as shown at block 604. As indicated at block 606, L2 cache 230 (i.e., master 284 of L2 cache 230) then reads cache directory 292 of L2 cache 230 to determine whether or not a castout is to be performed, for example, by determining if the selected victim cache line has a data-valid coherence state (e.g., Mx, Tx or Sx, where the "x" refers to any variant of the base coherence state) or a scope-state indication coherence state, such as Ig or In. If not, then the CO buffer 295 allocated to the L2 eviction is deallocated and assumes the "done" state (block 610). Because the victim cache line contains no valid data that must be preserved, L2 cache 230 can also indicate that the storage location of the victim cache line in the L2 cache array 284 has been evacuated (blocks 612, 614) and can be filled with a new cache line of data (i.e., the target cache line of the request of the processor core).

Returning to block 606, if the L2 cache determines that L2 cache directory 292 indicates that a castout is to be performed, L2 cache 230 does not immediately perform a read of L2 cache array 284, as is performed in the conventional process depicted in FIG. 5. Instead, L2 cache 230 transmits a cast-in command to the L3 cache 232 (block 608). The cast-in command may contain or be accompanied by the real address of the victim cache line, the L2 coherence state, and the CO buffer ID of the allocated CO buffer 295.

In response to receipt of the cast-in command, L3 cache 232 reads the coherence state associated with the specified address in its L3 cache directory 292 (block 620). If the L3 cache directory 292 indicates a data-valid coherence state (block 622), then the cast-in data already resides in the L3 cache array 284, and no data update to the L3 cache array 284 is required, as indicated by block 624. Accordingly, L3 cache 232 signals L2 cache 230 to retire the CO buffer 295 allocated to the L2 eviction by issuing an appropriate command specifying the CO buffer ID, as indicated by the arrow connecting block 622 to block 640. In addition, as shown at block 630, L3 cache 232 updates the coherency state of the victim cache line in the L3 cache directory 292 in accordance with Table VIII, below. Thereafter, the L3 directory update completes at block 632.

Referring again to block 622, if L3 cache 232 determines that the address specified by the cast-in command misses in L3 cache array 284, then L3 cache 232 begins the process of evicting a selected victim cache line from L3 cache array 284 (block 626), as described further below with reference to FIG. 7A. L3 cache 232 then provides to L2 cache 230 a status signal referencing the CO buffer ID, thereby indicating that a data move from L2 cache 230 to L3 cache 232 will be performed (block 628). In addition, as shown at block 630, L3 cache 232 updates the coherency state of the victim cache line in L3 cache directory 292 in accordance with Table VIII, below.

TABLE VIII

| Initial L3 State | L2 Castout State | | | | | | | | | | | | |
|---|---|---|---|---|---|---|---|---|---|---|---|---|---|
| | Mu | M | Me | Tup | Tp | Tep | T | Te | Tn | Ten | SL | S | Ig | In |
| Mu | Err | Err | Err | Err | Err | Err | Err | Err | Err | Err | Err | Err | Mu | Mu |
| Me | Err | Err | Err | Err | Err | Err | Err | Err | Err | Err | Err | Err | Me | Me |
| M | Err | Err | Err | Err | Err | Err | Err | Err | Err | Err | Err | Err | M | M |
| T | Err | Err | Err | Err | Err | Err | Err | Err | Err | Err | T | T | T | T |
| Te | Err | Err | Err | Err | Err | Err | Err | Err | Err | Err | Te | Te | Te | Te |
| Tn | Err | Err | Err | Err | Err | Err | Err | Err | Err | Err | Tn | Tn | Tn | Tn |
| Ten | Err | Err | Err | Err | Err | Err | Err | Err | Err | Err | Ten | Ten | Ten | Ten |
| SL | Err | Err | Err | Err | Err | Err | T | Te | Tn | Ten | Err | SL | Ig | SL |
| S | Err | Err | Err | Mu | M | Me | T | Te | Tn | Ten | SL | S | Ig | S |
| Ig | Mu | M | Me | Err | Err | Err | T | Te | Tn | Ten | Ig | Ig | Ig | Ig |
| In | Mu | M | Me | Err | Err | Err | T | Te | Tn | Ten | SL | S | Ig | In |
| I | Mu | M | Me | Mu | M | Me | T | Te | Tn | Ten | SL | S | Ig | In |

As indicated in Table VIII and as described above, an L2 castout of a victim cache line in any of the Txp coherence states advantageously permits the corresponding Mx coherence state to be reformed in L3 cache directory 292 without any coherence messaging with any other vertical cache hierarchy. Following block 630, the L3 directory update completes at block 632. Thus, the directory update can be performed in advance of initiation of the data move, if required.

Referring now to block 642, in response to receipt of the status signal from L3 cache 232 indicating that a data move is to be performed, L2 cache 230 expends the power required to read the selected victim cache line from the L2 cache array 284 into the allocated CO buffer 295. In response to the read of L2 cache array 284, L2 cache 230 can indicate that the storage location of the victim cache line in the L2 array has been evacuated (blocks 644, 646) and can therefore be filled with a new cache line of data. In addition, L2 cache 230 sends to L3 cache 232 a data ready signal specifying the CO buffer ID in order to indicate that the victim cache line has been read into the allocated CO buffer 295 (block 650).

In response to the data ready signal, L3 cache 232 initiates a data move of the cast-in data from the CO buffer 295 of L2 cache 230 to L3 cache 232 by issuing to L2 cache 230 a data move command specifying the relevant CO buffer ID (block 652). In response to receipt of the data move command of L3 cache 232, L2 cache 230 transfers the data in the specified CO buffer 295 to L3 cache 232, as indicated at block 654. In a typical implementation, the victim cache line is transmitted in association with the CO buffer ID. Following the data transfer, L2 cache 230 retires or deallocates the CO buffer 295 allocated to the L2 eviction (block 656), indicating usage of the CO buffer 295 is complete (block 658). In response to receipt of the victim cache line and CO buffer ID, L3 cache 232 places the cast-in data into L3 cache array 284 in the location indicated by the CO buffer ID (block 660), thereby completing the movement of the victim cache line from L2 cache 230 to the cache array of the L3 cache 232 (block 662).

With reference now to FIG. 7A, there is illustrated a high level logical flowchart of an L3 eviction in accordance with one embodiment. The process begins at block 700, for example, in response to initiation of an L3 eviction at block 626 of FIG. 6. In response to initiation of the L3 eviction, L3 cache 232 (i.e., master 284 of L3 cache 232) allocates a CO buffer 295 to the L3 eviction and selects a victim cache line for replacement in accordance with a selected replacement policy (e.g., least recently used), as shown at block 702. As indicated at block 704, L3 cache 232 then reads the L3 cache directory 292 to determine whether or not the selected victim cache line has an associated coherence state that indicates a castout should be performed. In at least one embodiment, the determination is made in accordance with Tables I and II above.

If L3 cache 232 determines at block 704 that no castout is to be performed, then the CO buffer 295 allocated to the L3 eviction is deallocated and assumes the "done" state (block 710). Because the victim cache line contains no valid data that must be preserved, the L3 victim cache can also indicate that the storage location of the victim cache line in the L3 array has been evacuated (blocks 712, 714) and can be filled with a new cache line of data.

Returning to block 704, if the L3 victim cache determines that a castout is to be performed for the victim cache line, then the L3 cache reads the victim cache line from the L3 cache array into the allocated castout (CO) buffer, as depicted at block 706. The L3 cache then indicates that the storage location of the victim cache line in the L3 array has been evacuated (blocks 712, 714). In addition, the L3 victim cache transmits a CO command 270 on the interconnect fabric via interconnect logic 212 (block 716) and then awaits a combined response (from the process shown in FIG. 7C) providing a system-wide coherency response to the CO command (block 720). The activity of the snoopers (e.g., IMCs 206 and snoopers 286 of L2 caches 230 and L3 caches 232) in response to receipt of the CO command and the generation of the combined response are described below with reference to FIGS. 7B and 7C, respectively.

In response to receipt of the combined response of the CO command, the L3 victim cache determines whether or not the combined response indicates success of the CO command at block 722. If not, the L3 victim cache waits for a "backoff" time, which can be selected randomly within a predetermined range in order to reduce deadlocks (block 724). Thereafter, the process returns to block 716, which has been described. Referring again to block 722, if the combined response indicates that the CO command was successful, the L3 victim cache determines at block 726 whether the castout entails transmission of the victim cache line. For example, if the victim cache line is in the Ig state, meaning that the data is invalid, then no transmission of the data of the victim cache line is to be performed. If, on the other hand, the victim cache line is in the T state, the L3 victim cache will determine that the victim cache line data are to be transmitted to a snooper. If a determination is made that the victim cache line data are to be transmitted, the L3 victim cache transmits the victim cache line data 274 from the CO buffer to the destination (e.g., an IMC 206) at block 728. Thereafter, the L3 victim cache retires the CO buffer allocated to the L3 eviction (block 730), giving the CO buffer a "done" status (block 732). If, however, the L3 victim cache determines at block 726 that no transmission of the victim cache line data is to be performed, then the process simply passes from block 726 to blocks 730 and 732, which have been described.

Figure 7B:
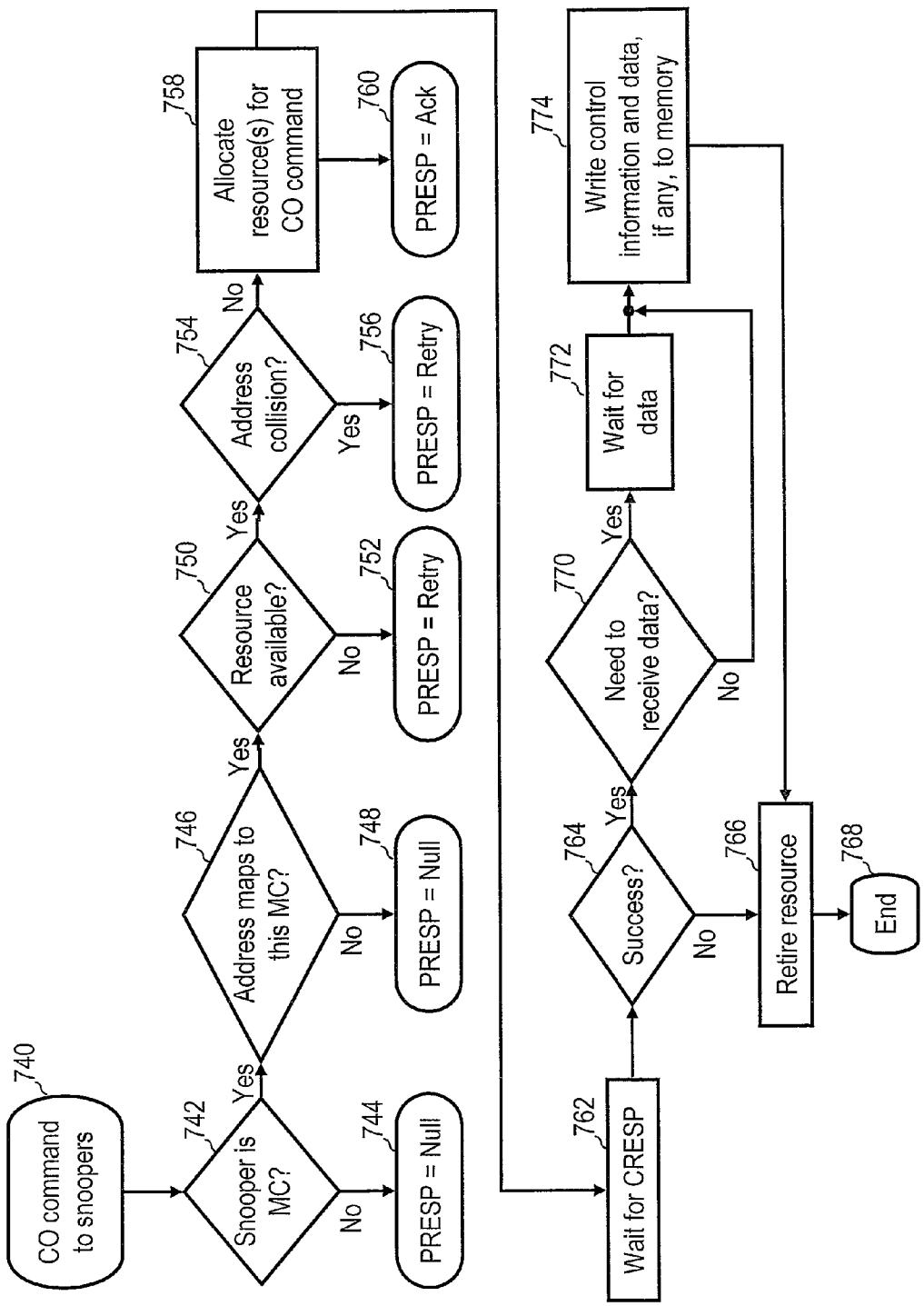
FIG. 7B is a high level logical flowchart of an exemplary process by which a snooper handles a castout (CO) command in accordance with one embodiment.

Referring now to FIG. 7B, there is depicted a high level logical flowchart of an exemplary process by which each snooper (e.g., IMC 206 or snooper 286 of an L2 cache 230 or L3 cache 232) receiving a castout (CO) command handles the CO command in accordance with one embodiment. The process begins at block 740 of FIG. 7B and then proceeds to block 742, which illustrates that if the snooper receiving the CO command is not a memory controller, such as an IMC 206, then the snooper provides a Null partial response to the CO command (block 744). The Null partial response indicates that the snooper has no interest in the command or its outcome. If the snooper of the CO command is a memory controller, then the process passes from block 742 to block 746. Block 746 illustrates the memory controller determining whether or not it is assigned the real address specified by the CO command. If not, the memory controller issues a Null partial response (block 748).

If, however, the snooping memory controller determines at block 746 that it is assigned the real address specified by the CO command, then the memory controller determines at block 750 whether or not it has sufficient resources (e.g., a queue entry and an available access cycle) available to currently handle the CO command. If not, the memory controller provides a Retry partial response requesting that the CO command be retried (block 752). If, on the other hand, the snooping memory controller determines that it has sufficient resources currently available to handle the CO command, then the snooping memory controller determines at block 754 whether or not the real address specified by the CO command collides with the address of a pending, previously received command. If so, then the snooping memory controller provides a Retry partial response requesting that the CO command be retried (block 756).

If the snooping memory controller does not detect an address collision at block 754, then the snooping memory controller allocates resource(s) for handling the CO command (block 758) and provides an Ack partial response (block 760), which acknowledges receipt of the CO command by an interested snooper. Thereafter, the snooping memory controller awaits receipt of the combined response (CRESP) generated by the process of FIG. 7C for the CO command (block 762). In response to receipt of the combined response of the CO command, the snooping memory controller determines whether or not the combined response indicates success of the CO command at block 764. If not, the snooping memory controller retires the resource(s) allocated to the CO command (block 766), and the process ends at block 768.

Referring again to block 764, if the combined response indicates that the CO command was successful, the snooping memory controller determines at block 770 whether the combined response indicates that the castout entails transmission of the victim cache line to the snooper. If not, the process proceeds to block 774, which is described below. If, however, the combined response indicates that the castout entails transmission of the victim cache line to the snooper, the snooping memory controller awaits receipt of the victim cache line data at block 772. Thereafter, at block 774, the snooping memory controller updates system memory 108 with control information (e.g., the scope information represented by certain of the coherence states) and the victim cache line data, if any. Thereafter, the process passes to block 766 and 768, which have been described.

Figure 7C:
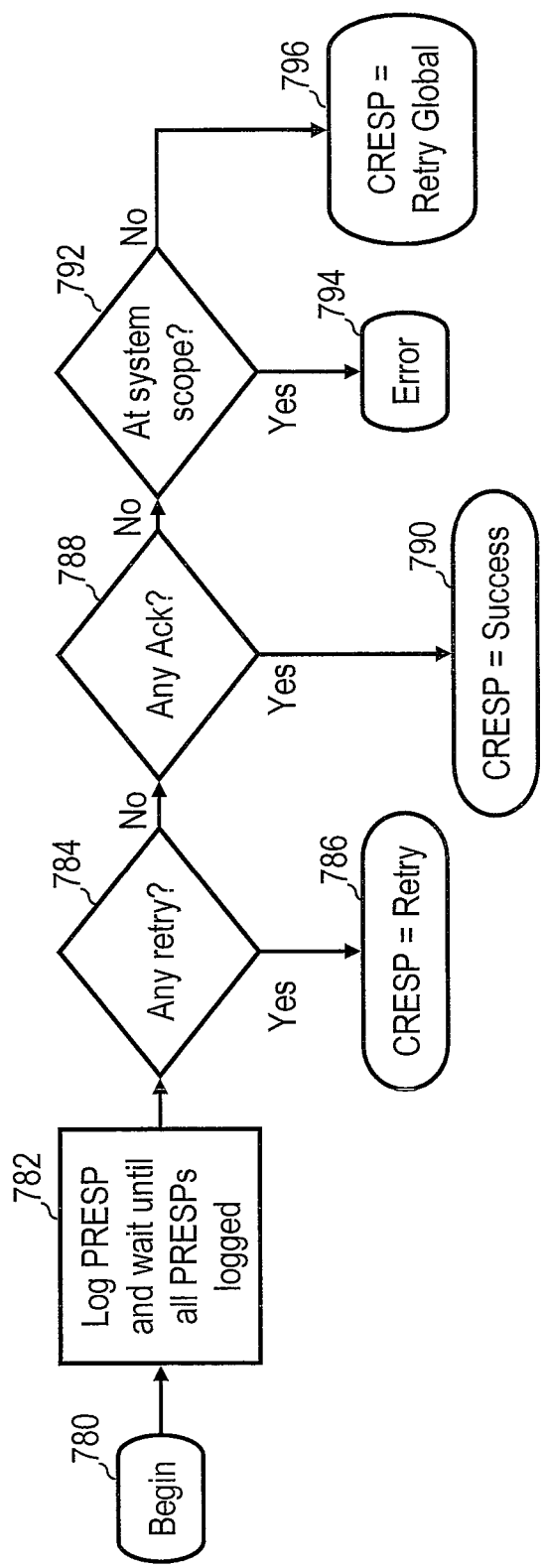
FIG. 7C is a high level logical flowchart of the processing of the coherence responses of a castout (CO) command in accordance with one embodiment.

With reference now to FIG. 7C is a high level logical flowchart of an exemplary process by which the partial responses of a castout (CO) command are utilized to generate a combined response in accordance with one embodiment. The illustrated process may be performed, for example, by a predetermined instance of coherence management logic 210, such as the instance of coherence management logic 210 located in the processing unit 104 of the L3 cache 232 initiating the castout.

The illustrated process begins at block 780 in response to receipt by coherence management logic 210 of a partial response of a snooper to a CO command of an L3 cache 232 and then proceeds to block 782. Block 782 depicts coherence management logic 210 logging the partial response of the CO command and waiting until all such partial responses have been received and logged. Coherence management logic 210 next determines at block 784 whether any of the partial responses were Retry partial responses. If so, coherence management logic 210 generates and provides to all participants a Retry combined response (block 786). If none of the partial responses were Retry partial responses, then coherence management logic 210 provides a Success combined response if the partial responses include an Ack partial response (blocks 788 and 790).

If no Retry or Ack partial response was received for the CO command, coherence management logic 210 determines at block 792 whether the CO command was issued on the interconnect fabric with a global scope including all processing nodes 102. If so, the process ends with an error condition at block 794 in that no memory controller responded to the CO command as responsible for the real address specified by the CO command. If, however, coherence management logic 210 determines at block 792 that the CO command was issued with a more restricted scope than a global scope including all processing nodes 102, then coherence management logic 210 generates and provides to all participants a Retry Global combined response indicating that the L3 cache 232 that issued the CO command should retry the CO command with a global scope including all processing nodes 102 of data processing system 100.

As has been described, power dissipation in a cache memory hierarchy including an upper level cache and a lower level victim cache is reduced by reducing accesses to a cache array and/or movement of data between the upper and lower level caches. In at least one embodiment, data movement from the upper level cache to the lower level victim cache is reduced by increasing the likelihood that data evicted from the upper level cache already resides in the lower level victim cache. Thus, power dissipation associated with the data transfer and write access to the data array of the lower level cache can be avoided. Access to the data array of the upper level cache and the concomitant power dissipation of such access can also be avoided in the case of a miss in the upper level cache by conditioning access to the data array of the upper level cache on the results of a directory lookup in the lower level victim cache.

While one or more embodiments have been particularly shown and described, it will be understood by those skilled in the art that various changes in form and detail may be made therein without departing from the spirit and scope of the invention. For example, although aspects of the present invention have been described with respect to data processing system hardware, it should be understood that one or more embodiments of the present invention may alternatively be implemented as a program product for use with a data processing system. Such program product(s) include(s) a computer readable medium that stores or encodes program code that directs the functions of the present invention. The computer readable medium may be implemented, for example, as a tangible storage medium (e.g., CD-ROM, DVD, diskette or hard disk, system memory, flash memory, etc.) or communication media, such as digital and analog networks.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a multiprocessor data processing system including a plurality of processor cores each having a respective associated one of a plurality of vertical cache hierarchies, each vertical cache hierarchy including a lower latency upper level cache and a high latency lower level cache, said method comprising:
   in response to a memory access request of a processor core among the plurality of processor cores, said memory access request targeting a target cache line:
      the lower level cache of a vertical cache hierarchy associated with the processor core supplying a copy of the target cache line to the upper level cache in the vertical cache hierarchy and retaining a copy of the target cache line in a shared coherence state;
      the upper level cache holding the copy of the target cache line received from the lower level cache in a private shared ownership coherence state indicating that each cached copy of the target cache line is cached within the vertical cache hierarchy associated with the processor core;
   in response to the upper level cache signaling replacement of the copy of the target cache line in the private shared ownership coherence state, the lower level cache associating the target cache line with an exclusive ownership coherence state in absence of coherency messaging with any other of the plurality of vertical cache hierarchies.

2. The method of claim 1, wherein:
   the memory access request is a read request requesting the copy of the target cache line for query purposes and not for modification; and
   the method further comprising the lower level cache holding the target cache line in the exclusive ownership coherence state immediately prior to receipt of the memory access request.

3. The method of claim 1, and further comprising the upper level cache refraining from transmitting a copy of the target cache line to the lower level cache when replacing the target cache line in the upper level cache, if the lower cache retains its copy of the target cache line in the shared coherence state when the copy of the target cache line is replaced in the upper level cache.

4. The method of claim 1, wherein:
   the data processing system includes a system memory; and
   the private shared ownership coherence state indicates that the target cache line is unmodified with respect to a corresponding memory block in the system memory.

5. The method of claim 1, wherein the lower level cache is a lower level victim cache populated by cache lines castout from the upper level cache.

6. The method of claim 1, wherein:
the method further comprising the lower level cache receiving a combined response representing a system-wide coherence response to the memory access request of the processor core; and
the lower level cache supplying a copy of the target cache line to the upper level cache comprises the lower level cache supplying the copy of the target cache line to the upper level cache prior to receipt of a combined response of the memory access request.

7. A processing unit for a multiprocessor data processing system, the processing unit comprising:
a processor core; and
a vertical cache hierarchy coupled to the processor core to provide low latency data access, the cache hierarchy including an upper level cache coupled to the processor core and a lower level cache coupled to the upper level cache, each of the upper level cache and the lower level cache including a respective cache directory and a respective data array, wherein responsive to a memory access request of the processor core requesting access to a target cache line, the lower level cache retains a copy of the target cache line in a shared coherence state and supplies a copy of the target cache line to the upper level cache which holds its copy of the target cache line in a private shared ownership coherence state indicating that each cached copy of the target cache line in the multi-processor data processing system is cached within the vertical cache hierarchy associated with the processor core, and wherein responsive to the upper level cache signaling replacement of the copy of the target cache line in the private shared ownership coherence state, the lower level cache associates the target cache line with an exclusive ownership coherence state in absence of coherency messaging with any other of a plurality of vertical cache hierarchies in the multiprocessor data processing system.

8. The processing unit of claim 7, wherein:
the memory access request is a read request requesting the copy of the target cache line for query purposes and not for modification; and
the lower level cache, immediately prior to receipt of the memory access request, holds the target cache line in the exclusive ownership coherence state.

9. The processing unit of claim 7, wherein the upper level cache refrains from transmitting a copy of the target cache line to the lower level cache when replacing the target cache line in the upper level cache if the lower cache retains its copy of the target cache line in the shared coherence state when the copy of the target cache line is replaced in the upper level cache.

10. The processing unit of claim 7, wherein:
the data processing system includes a system memory; and
the private shared ownership coherence state indicates that the target cache line is unmodified with respect to a corresponding memory block in the system memory.

11. The processing unit of claim 7, wherein the lower level cache is a lower level victim cache populated by cache lines castout from the upper level cache.

12. The processing unit of claim 7, wherein:
the lower level cache receives a combined response representing a system-wide coherence response to the memory access request of the processor core; and
the lower level cache supplies the copy of the target cache line to the upper level cache prior to receipt of the combined response of the memory access request.

13. A data processing system, comprising:
at least one system memory; and
a plurality of processing units coupled to the system memory, wherein a processing unit among the plurality of processing units includes:
a processor core; and
a vertical cache hierarchy coupled to the processor core to provide low latency data access, the cache hierarchy including an upper level cache coupled to the processor core and a lower level cache coupled to the upper level cache, each of the upper level cache and the lower level cache including a respective cache directory and a respective data array, wherein responsive to a memory access request of the processor core requesting access to a target cache line, the lower level cache retains a copy of the target cache line in a shared coherence state and supplies a copy of the target cache line to the upper level cache which holds its copy of the target cache line in a private shared ownership coherence state indicating that each cached copy of the target cache line in the multi-processor data processing system is cached within the vertical cache hierarchy associated with the processor core, and wherein responsive to the upper level cache signaling replacement of the copy of the target cache line in the private shared ownership coherence state, the lower level cache associates the target cache line with an exclusive ownership coherence state in absence of coherency messaging with any other of a plurality of vertical cache hierarchies in the multiprocessor data processing system.

14. The data processing system of claim 13, wherein:
the memory access request is a read request requesting the copy of the target cache line for query purposes and not for modification; and
the lower level cache, immediately prior to receipt of the memory access request, holds the target cache line in the exclusive ownership coherence state.

15. The data processing system of claim 13, wherein the upper level cache refrains from transmitting a copy of the target cache line to the lower level cache when replacing the target cache line in the upper level cache if the lower cache retains its copy of the target cache line in the shared coherence state when the copy of the target cache line is replaced in the upper level cache.

16. The data processing system of claim 13, wherein:
the data processing system includes a system memory; and
the private shared ownership coherence state indicates that the target cache line is unmodified with respect to a corresponding memory block in the system memory.

17. The data processing system of claim 13, wherein the lower level cache is a lower level victim cache populated by cache lines castout from the upper level cache.

18. The data processing system of claim 13, wherein:
the lower level cache receives a combined response representing a system-wide coherence response to the memory access request of the processor core; and
the lower level cache supplies the copy of the target cache line to the upper level cache prior to receipt of the combined response of the memory access request.

* * * * *